United States Patent
Miyano

(10) Patent No.: US 9,984,300 B2
(45) Date of Patent: May 29, 2018

(54) IMAGE PROCESSING SYSTEM, IMAGE PROCESSING METHOD, AND PROGRAM

(71) Applicant: NEC Corporation, Tokyo (JP)

(72) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 14/428,770

(22) PCT Filed: Aug. 30, 2013

(86) PCT No.: PCT/JP2013/073339
§ 371 (c)(1),
(2) Date: Mar. 17, 2015

(87) PCT Pub. No.: WO2014/045843
PCT Pub. Date: Mar. 27, 2014

(65) Prior Publication Data
US 2015/0220798 A1    Aug. 6, 2015

(30) Foreign Application Priority Data

Sep. 19, 2012 (JP) .................................. 2012-205912

(51) Int. Cl.
*G06K 9/00* (2006.01)
*H04N 7/18* (2006.01)
(Continued)

(52) U.S. Cl.
CPC ..... *G06K 9/00885* (2013.01); *G06K 9/00369* (2013.01); *G06K 9/00711* (2013.01);
(Continued)

(58) Field of Classification Search
None
See application file for complete search history.

(56) References Cited

U.S. PATENT DOCUMENTS 6,005,493 A * 12/1999 Taniguchi ................. G06T 7/20
340/990
6,445,409 B1 * 9/2002 Ito .......................... G01S 3/783
348/155
(Continued)

FOREIGN PATENT DOCUMENTS

JP    2005-86626    3/2005
JP    2006-229465   8/2006
(Continued)

OTHER PUBLICATIONS

International Search Report dated Oct. 22, 2013 in corresponding PCT International Application.
(Continued)

*Primary Examiner* — Kim Vu
*Assistant Examiner* — Nathan Bloom
(74) *Attorney, Agent, or Firm* — Finnegan, Henderson, Farabow, Garrett & Dunner, L.L.P.

(57) ABSTRACT

Provided are an image processing system, an image processing method, and a program capable of suitably performing the association of a person appearing in a picture in accordance with a highly reliable user input. This image processing system includes: an input unit for receiving an input of pictures captured by multiple video cameras; a person-to-be-tracked registration unit capable of registering one or more persons appearing in the pictures input from the input unit; a moving image display unit for displaying, on a display device, the pictures input by the input unit, and a UI generation unit capable of registering that the person appearing in the displayed pictures and the person registered by the person-to-be-tracked registration unit are the same person, or not the same person.

16 Claims, 11 Drawing Sheets

(51) Int. Cl.
*G06T 7/20* (2017.01)
*G06K 9/32* (2006.01)
*G06Q 30/02* (2012.01)
*G06T 7/246* (2017.01)

(52) U.S. Cl.
CPC .............. *G06Q 30/02* (2013.01); *G06T 7/20* (2013.01); *G06T 7/251* (2017.01); *H04N 7/18* (2013.01); *G06K 2009/3291* (2013.01); *G06T 2207/10016* (2013.01); *G06T 2207/30196* (2013.01); *G06T 2207/30232* (2013.01)

(56) References Cited

U.S. PATENT DOCUMENTS

| | | | | |
|---|---|---|---|---|
| 6,999,614 | B1* | 2/2006 | Bakker | G06T 7/0004 382/145 |
| 2005/0105806 | A1* | 5/2005 | Nagaoka | G06F 17/30247 382/224 |
| 2005/0162442 | A1* | 7/2005 | Baba | G06K 9/00711 345/612 |
| 2005/0206726 | A1* | 9/2005 | Yoshida | H04N 7/181 348/143 |
| 2009/0009598 | A1* | 1/2009 | Sotodate | H04N 5/76 348/143 |
| 2009/0059002 | A1* | 3/2009 | Kim | G08B 13/19671 348/143 |
| 2009/0275365 | A1* | 11/2009 | Lee | H04M 1/271 455/563 |
| 2009/0285544 | A1* | 11/2009 | Fitzgibbon | G06T 7/2033 386/278 |
| 2009/0324020 | A1* | 12/2009 | Hasebe | G06K 9/00228 382/115 |
| 2012/0062732 | A1* | 3/2012 | Marman | H04N 7/18 348/142 |
| 2012/0294496 | A1* | 11/2012 | Nakamoto | G06K 9/00288 382/118 |
| 2013/0050502 | A1* | 2/2013 | Saito | G06T 7/20 348/169 |
| 2013/0129231 | A1* | 5/2013 | Dale | G06K 9/6254 382/224 |
| 2013/0339998 | A1* | 12/2013 | Arme | H04N 21/4668 725/32 |
| 2015/0005002 | A1* | 1/2015 | Boulay | G01S 5/0072 455/456.1 |
| 2015/0248751 | A1* | 9/2015 | Ebiyama | G06T 7/204 382/294 |

FOREIGN PATENT DOCUMENTS

| | | |
|---|---|---|
| JP | 2007-219603 | 8/2007 |
| JP | 2008-219570 | 9/2008 |
| JP | 2009-27393 | 2/2009 |
| JP | 2009-98774 | 5/2009 |
| JP | 2011-170562 | 9/2011 |
| JP | 2011-170563 | 9/2011 |
| WO | WO 2011/102416 A1 | 8/2011 |

OTHER PUBLICATIONS

International Preliminary Report on Patentability dated Jan. 7, 2015, in corresponding PCT Application No. PCT/JP2013/073339.

* cited by examiner

IMAGE PROCESSING SYSTEM, IMAGE PROCESSING METHOD, AND PROGRAM

CROSS-REFERENCE TO RELATED PATENT APPLICATIONS

This application is a National Stage Entry of International Application No. PCT/JP2013/073339, filed Aug. 30, 2013, which claims priority from Japanese Patent Application No. 2012-205912, filed Sep. 19, 2012. The entire contents of the above-referenced applications are expressly incorporated herein by reference.

BACKGROUND

Modes according to the present invention relate to an image processing system, an image processing method, and a program.

In recent years, considered is a system of monitoring a wide range using pictures from a plurality of cameras. For example, Patent Publication JP-A-2008-219570 discloses a device for appropriately tracking (monitoring) a person spanning across multiple cameras by using coupling relation information between the cameras. This device obtains the correspondence relationship of the person according to the similarity of the person characteristic feature value at the point (In point) that the person appears in the camera view, and the point (Out point) that the person disappears from the camera view.

SUMMARY

Upon automatically setting the correspondence relationship of the person according to the similarity as with the device described in Patent Publication JP-A-2008-219570, an error will arise with a fixed probability. Thus, there are demands for performing the association of a person in a manner of involving a human. Nevertheless, even when a human performs the association, it may not be possible to determine the association in cases where there are a plurality of persons with similar appearances.

Meanwhile, when a human is involved, a system capable of obtaining more accurate results based on the user's determination, which is highly reliable, should be created. In particular, in a system for monitoring (tracking) numerous persons, there are demands for promptly performing the association of persons without any inconsistency.

The several modes of the present invention were devised in view of the foregoing problems, and one object of this invention is to provide an image processing system, an image processing method, and a program capable of favorably performing the association of a person appearing in the picture according to a highly reliable user input.

The image processing system according to the present invention includes: input means for receiving an input of pictures captured by a plurality of video cameras; registration means capable of registering one or more persons appearing in the pictures input from the input means; first display control means for displaying, on a display device, the pictures input by the input means; and second display control means capable of registering that the person appearing in the displayed pictures and the person registered by the registration means are the same person, or not the same person.

The image processing method to be performed by an image processing system according to the present invention includes the steps of: receiving an input of pictures captured by a plurality of video cameras; enabling registration of one or more persons appearing in the input pictures; displaying the input pictures on a display device; and enabling registration to the effect that the person appearing in the displayed pictures and the registered person are the same person, or not the same person.

The program according to the present invention causes a computer to execute: processing of receiving an input of pictures captured by a plurality of video cameras; processing of enabling registration of one or more persons appearing in the input pictures; processing of displaying the input pictures on a display device; and processing of enabling registration to the effect that the person appearing in the displayed pictures and the registered person are the same person, or not the same person.

Note that, in the present invention, terms such as "unit" or "means", "apparatus", "system" do not simply refer to physical means, and also include cases of realizing, via software, the functions of such "unit" or "means", "apparatus", "system". Moreover, the functions of one "unit" or "means", "apparatus", "system" may be realized by two or more physical means or devices, or the functions of two or more "units" or "means", "apparatuses", "systems" may be realized by one physical means or device.

According to the present invention, it is possible to provide an image processing system, an image processing method, and a program capable of favorably performing the association of a person appearing in the picture according to a highly reliable user input.

DETAILED DESCRIPTION

Figure 1:
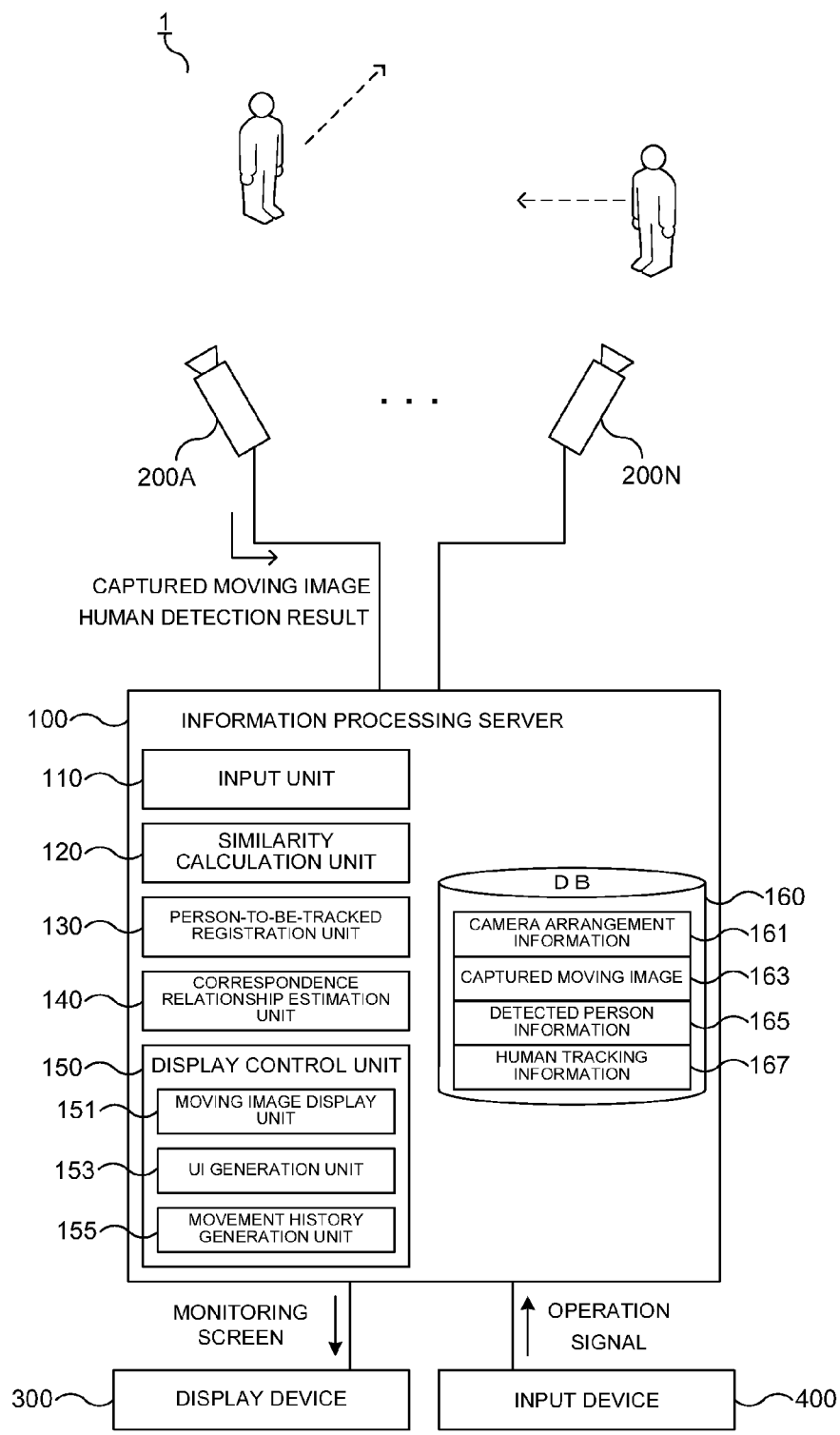
FIG. 1 is a functional block diagram showing a schematic configuration of the monitoring system according to the first embodiment.

Embodiments of the present invention are now explained. The same or similar configuration in the descriptions of the ensuing explanation and reference drawings is given the same or similar reference numeral.

1 First Embodiment

FIG. 1 to FIG. 10 are diagrams explaining the first embodiment. This embodiment is now explained in accordance with the following flow with reference to FIG. 1 to FIG. 10. Foremost, the functional configuration of the system is described in Section "1.1", and the outline of operation is described in Section "1.2" by illustrating specific examples of the display screen. Subsequently, the flow of processing is described in Section "1.3", and specific examples of the hardware configuration capable of implementing this system are indicated in Section "1.4". Finally, the effect of this embodiment is explained in Section "1.5" onward.

(1.1 System Configuration)

(1.1.1 Outline of System Configuration)

The system configuration of the monitoring system 1 as the image processing system according to this embodiment is now explained with reference to FIG. 1. FIG. 1 is a block diagram showing the system configuration of the monitoring system 1.

The monitoring system 1 is basically configured from an information processing server 100, a plurality of video cameras 200 for capturing (imaging) pictures (moving images) (video cameras 200A to 200N are hereinafter collectively referred to as the "video cameras 200"), a display device 300, and an input device 400.

While the monitoring system 1 is explained as a system for monitoring a person captured by the video cameras 200 in the ensuing explanation, the object to be monitored may also be applied to moving objects such as a vehicle, a bicycle, or a motorcycle.

The video cameras 200 capture pictures (moving images), and, upon determining whether a person is included in the captured pictures, sends information such as the position and characteristic feature value of that person, together with the captured moving images, to the information processing server 100. Moreover, the video cameras 200 can also track the person in the moving images by comparing the captured moving images between frames.

Note that the detection of a person and extraction of the characteristic feature value, and processing performed within the camera such as the tracking of a person may be performed, for example, by the information processing server 100 or by another information processing apparatus not shown.

The information processing server 100 performs various types of processing such as the detection of persons, the registration of the person to be tracked and the tracking of the registered person by analyzing the moving images captured by the video cameras 200.

Note that, while a case of performing the human monitoring based on the real-time pictures captured by the video cameras 200, the configuration is not limited thereto, and, for example, considered may be cases where, after being captured by the video cameras 200, the moving images stored in a storage device (for instance, hard disk drive (HDD), video cassette recorder (VCR) or the like) are tracked (analyzed). In addition, considered may be cases where the moving images stored in the storage device are tracked by being reproduced in reverse (reverse playback). Normally, when a certain person exhibits suspicious behavior, since it is necessary to check what path that person took and what kind of actions were taken by that person up to the suspicious behavior, it is extremely useful to enable tracking based on the foregoing reverse playback.

Figure 3:
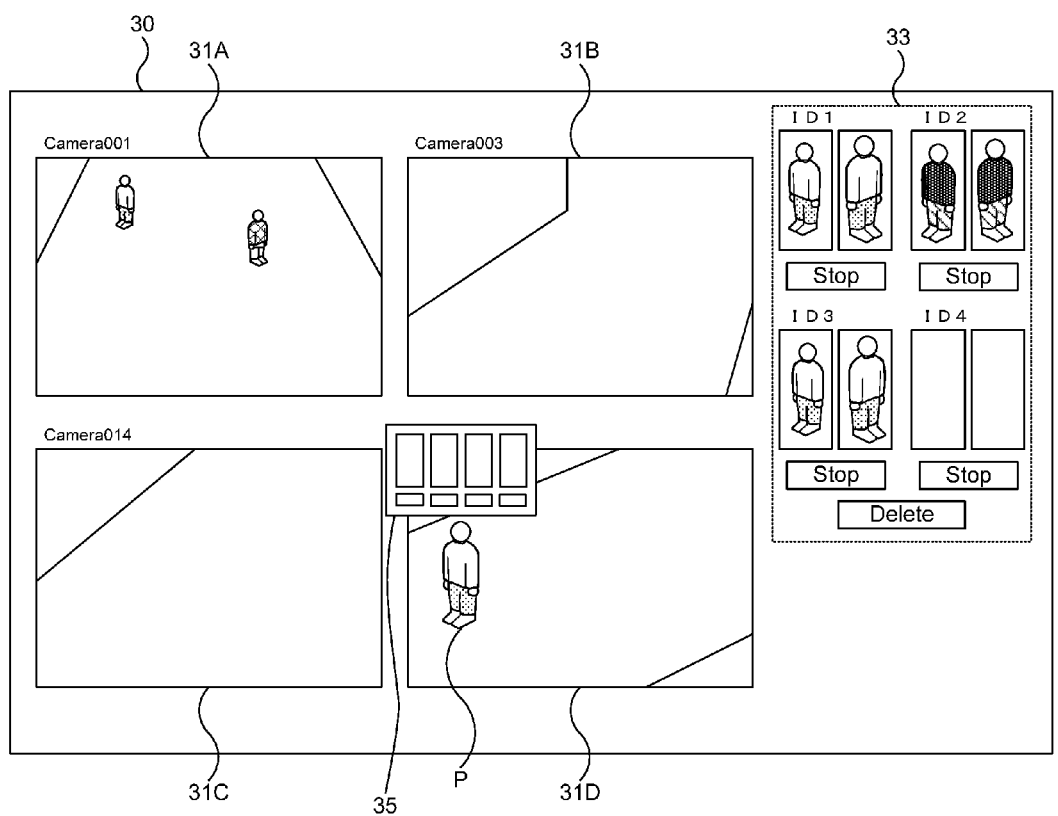
FIG. 3 is a diagram showing a specific example of the display screen.

During the monitoring of a person with the information processing server 100, the information processing server 100 outputs the monitoring screen to the display device 300, and receives, from the input device 400, operation signals of the various operation inputs pertaining to the monitoring of that person. More specifically, for example, with the monitoring screen (a specific example is illustrated in FIG. 3 described later) displayed on the display device 300, by displaying a plurality of pictures input from the video cameras 200, the user as the observer can understand the current location of the person to be monitored.

When the user as the observer views the display device 300 and a person to be monitored who appeared in the picture (moving image) of a certain video camera 200 appears in the picture of another video camera 200, the user operates the input device 400 and associates those two persons as being the same person. Moreover, in this embodiment, the fact that two persons are not the same person is also associated. As described above, as a result of enabling the user to manually perform the association of persons, and enabling the user to input two pieces of information; namely, that two persons are the same person and two persons are not the same person, the correspondence relationship of more persons to be monitored can be suitably estimated. This processing and the advantages thereof will be described later.

The display device 300 is a display for displaying images, for instance, on a liquid crystal or an organic electro luminescence (EL). The monitoring screen output from the information processing server 100 is displayed on the display device 300.

The input device 400 is a device that is used by the user (observer) for inputting various types of information. For instance, a mouse or a touch pad, a pointing device such as a touch panel, a keyboard and the like correspond to the input device 400. Various types of processing such as the registration of the person to be monitored, association of the registered person and the person who newly appeared in the video cameras 200 (input as the same person and input to the effect that they are not the same person) are performed based on the users operations made to the input device 400.

Note that various configurations of the information processing server 100, and the display device 300 and the input device 400 may be considered. For example, the display device 300 and the input device 400 may be realized with a single client, or the functions of the information processing server 100, the display device 300, and the input device 400 may be realized with four or more information processing apparatuses. Moreover, when the display device 300 and the input device 400 are realized as a single client, certain functions of the information processing server 100 according to this embodiment may be given to the client.

(1.1.2 Configuration of Information Processing Server 100)

The configuration of the information processing server 100 according to this embodiment is now explained. The information processing server 100 includes, as shown in FIG. 1, an input unit 110, a similarity calculation unit 120, a person-to-be-tracked registration unit 130, a correspondence relationship estimation unit 140, a display control unit 150, and a database (DB) 160. Note that the functions of the information processing server 100 may also be realized with a plurality of information processing apparatuses (computers).

The input unit 110 registers, in the DB 160, the pictures received from the video cameras 200 and information of the human detection result as the captured moving image 163 or the detected person information 165 and the human tracking information 167. The detected person information 165 that is registered by the input unit 110 in the DB 160 includes information of the characteristic feature value of the person detected by the video cameras 200. Moreover, the human tracking information 167 that is registered by the input unit 110 in the DB 160 includes information of the tracking result within the camera showing how the person detected by the video camera 200 moved within a single video cameras 200.

The similarity calculation unit 120 calculates the similarity of the person appearing in the moving image input from the video cameras 200 and the person registered in the detected person information 165. Here, the similarity calculation unit 120 may also calculate the similarity upon selecting a human image having a similar posture as the image of the person in the moving image input from the video cameras 200 among a plurality of human images (human images of the same person at various timings) of each of the registered persons. As a result of adopting the foregoing configuration, accuracy of the similarity calculation can be improved.

The person-to-be-tracked registration unit 130 registers the person appearing in the captured moving image input from the video cameras 200 in the human tracking information 167 of the DB 160 as the observee to be tracked (person to be monitored/person to be tracked) based on the user input that is input from the input device 400. Moreover, when the user determines that the person appearing in the captured picture input from the video cameras 200 is the same person as, or not the same person as, the person who was previously registered in the human tracking information 167, the person-to-be-tracked registration unit 130 may also registered that information in the human tracking information 167.

The correspondence relationship estimation unit 140 estimates the correspondence relationship of persons who appeared at different times of the respective video cameras 200 based on the user input to the effect that such person and the person previously registered in the human tracking information 167 are the same person, or not the same person, and registers the results in the human tracking information 167. While the specific methods will be described later with reference to FIG. 2 and other diagrams, when the user makes an input to the effect that a certain person is the same person/not the same person, the correspondence relationship estimation unit 140 also predicts the correspondence relationship of whether other persons are also such same person.

The display control unit 150 displays various display screens such as the monitoring screen on the display device 300. The display control unit 150 includes a moving image display unit 151, a UI generation unit 153, and a movement history generation unit 155.

The moving image display unit 151 displays the captured pictures input by the input unit 110 on the display device 300. In the example of FIG. 3 described later, a picture area displayed by the moving image display unit 151 is provided to a part of the monitoring screen. Note that the picture that the moving image display unit 151 displays on the display device 300 does not have to be a real-time. When displaying a recorded picture on the display device 300, the moving image display unit 151 reads the captured moving image 163 from the DB 160 and displays the captured moving image 163 on the display device 300.

Figure 8:
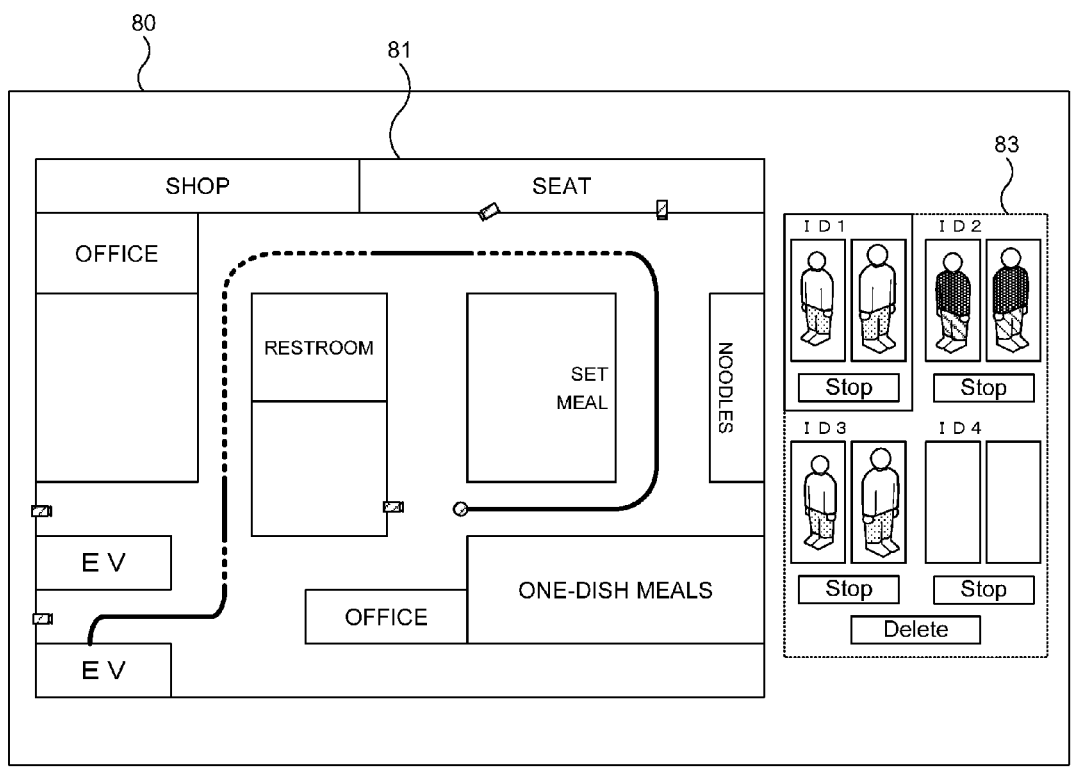
FIG. 8 is a diagram showing a specific example of the display screen.

The UI generation unit 153 generates various display screens for which specific examples thereof are shown in FIG. 3 and FIG. 8 described later, and displays such display screens on the display device 300. The registration of the person to be monitored and the association regarding whether persons are the same person are performed based on the graphical user interface (GUI) generated and provided by the UI generation unit 153.

The movement history generation unit 155 generates the movement history of the person to be monitored to be displayed on the movement history display screen, for which a specific example thereof is illustrated in FIG. 8 described later, based on the human tracking information 167.

The DB 160 is created, for example, on various storage devices such as an HDD not shown. The DB 160 stores camera arrangement information 161, a captured moving image 163, detected person information 165, and human tracking information 167.

The camera arrangement information 161 includes information such as the adjacent relation between cameras, and the distance between cameras (or the average time required for moving between the cameras). The camera arrangement information 161 is used by the correspondence relationship estimation unit 140 for estimating the correspondence relationship and by the movement history generation unit 155 for generating the movement history.

The human tracking information 167 includes tracking information of each person captured by the video cameras 200 (not only the persons to be monitored, but all detected persons). More specifically, the human tracking information 167 includes the tracking information of the person detected by the video cameras 200 within the camera (information showing the path of movement based on the same view angle), information showing into which shooting range of which video camera 200 the person appearing in a certain video camera 200 had moved to (corresponds to the correspondence relationship information showing how the respective persons appearing at different times of the respective video cameras 200 will correspond), and information showing what kind of association was performed by the user.

(1.2 Outline of Operation)

The functions and operations of the monitoring system 1 are now explained with reference to FIG. 2 to FIG. 8.

(1.2.2 Outline of Person Monitoring)

The outline of human tracking (human monitoring) is foremost explained with reference to FIG. 2.

With the monitoring system 1 according to this embodiment, as described above, when the user views the display screen of the display device 300 and a person to be monitored appearing in the picture of a certain video cameras 200 (person who has been previously registered as a monitoring target) appears in another video cameras 200, the user operates the input device 400 and associates those two persons as being the same person. Moreover, when a certain person is not a person to be monitored, the user operates the input device 400 and makes an input to the effect that the two persons are not the same person. As a result of enabling the user to input that persons are the same person, and that persons are not the same person, the monitoring system 1 obtains the correspondence relationship of persons of high probability among the possible correspondence relationship of persons.

The specific examples are now explained in further detail with reference to FIG. 2. In the example of FIG. 2, at time t, the person A, the person B, and the person C respectively appear in the pictures of three video cameras 200 corresponding to the "Camera 001", the "Camera 002", and the "Camera 003", and at time t+1, the person X and the person Y respectively appear in the "Camera 001" and the "Camera 002".

Figure 2:
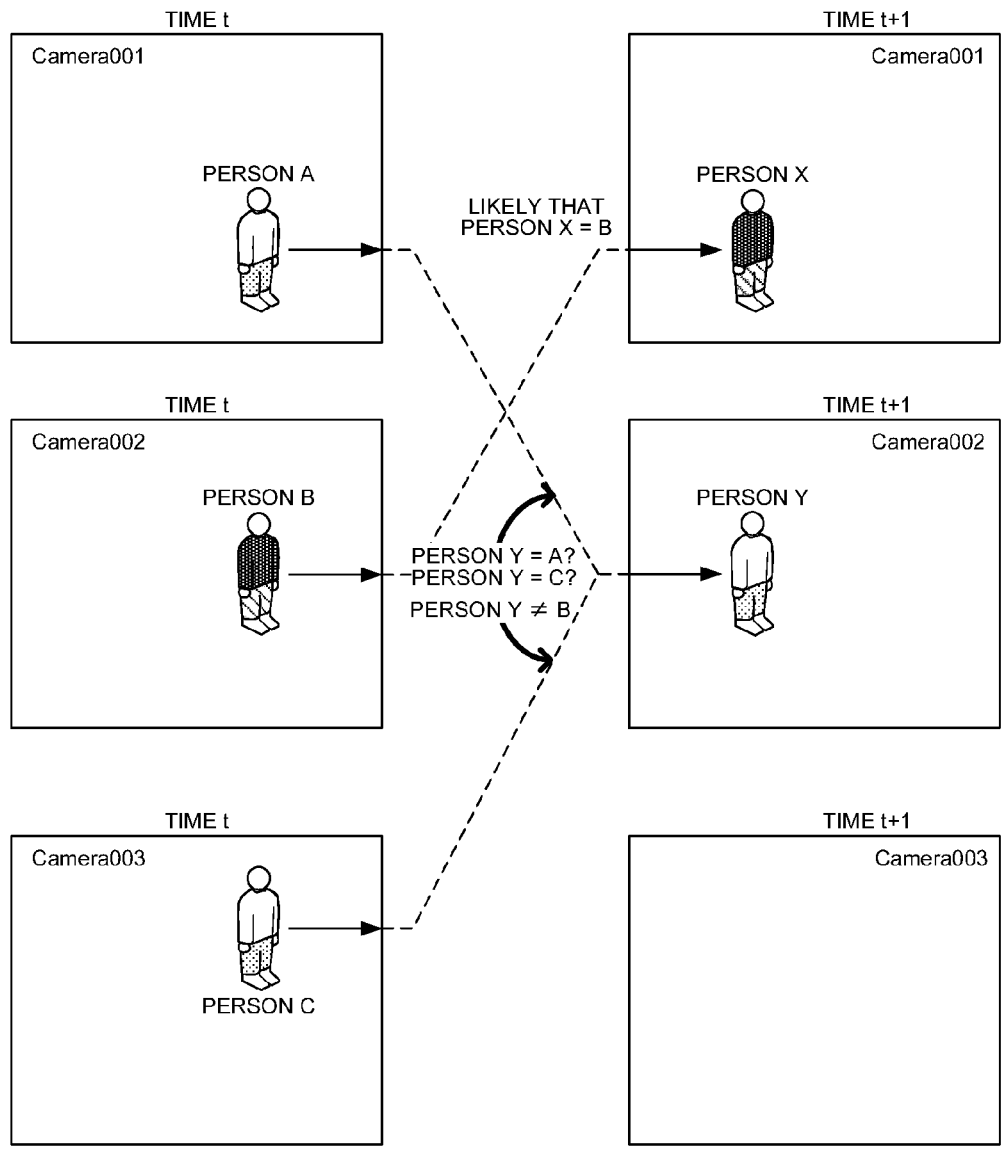
FIG. 2 is a diagram explaining the monitoring system according to the first embodiment.

Here, in the example of FIG. 2, on the path, let it be assumed that movement is possible from the right side of the screen of the "Camera 001" and the right side of the screen of the "Camera 003" to the left side of the screen of the shooting range of the "Camera 002", and movement is also possible from the right side of the screen of the "Camera 002" to the left side of the screen of the "Camera 001".

Moreover, let it be assumed that the person Y has a similar appearance as the person A and the person C (that is, has similar features; for instance, this corresponds to cases where the color of the clothes is the same), and the person X has a similar appearance as the person B.

In the foregoing case, with respect to the person X, since only the person B as similar features, the possibility that the person X and the person B are the same person is high. Meanwhile, with respect to the person Y, since there are two persons (person A and person C) who have similar features, it is difficult to determine to which person the person Y will become associated. Nevertheless, the user can easily determine that the person Y is, in the least, not the person B.

Since the search range of the shiftability of the person in future such as time t+1, time t+2 . . . can be narrowed by combining the inputs of highly reliable correspondence relationship of the foregoing "persons are the same person" and "persons are not the same person", with the monitoring system 1, the combination of possible (likely) correspondence relationships of persons can be suitably estimated.

The method of estimating the correspondence relationship of persons will be explained later with reference to FIG. 5 to FIG. 7.

(1.2.3 Specific Examples of Display Screen)

Specific examples of the display screen that is displayed by the display device 300 are now explained with reference to FIG. 3 and FIG. 4. FIG. 3 is a diagram showing a specific example of the display screen (hereinafter also referred to as the "monitoring screen 30") to be displayed on the display device 300 for human monitoring.

The example of the monitoring screen 30 illustrated in FIG. 3 includes picture areas 31A to 31D (hereinafter also collectively referred to as the "picture areas 31") for displaying the captured pictures input from a plurality of video cameras 200, and a person-to-be-monitored display area 33 displaying the person(s) to be monitored.

The picture areas 31 display multi-camera pictures input from a plurality of video cameras 200 as described above. Here, the pictures of the video cameras 200 displayed on the respective picture areas 31 may be switched as needed. For example, after the person to be monitored disappears from the display area, control for switching to the picture of the video camera 200, in which that person is expected to appear next, may be performed by the UI generation unit 153 and the moving image display unit 151 pursuant to the movement of that person.

The person-to-be-monitored display area 33 is an area where the user as the observer registers, among the persons appearing in the picture areas 31, the person or persons who are chosen to be monitored. As shown in the example of FIG. 3, a plurality of persons to be monitored may be selected (three persons in the example of FIG. 3). Moreover, a plurality of human images (two human images in the example of FIG. 3) of different postures; for instance, front view and rear view, of the respective persons are displayed in the person-to-be-monitored display area 33.

In addition, in the example of the monitoring screen 30 illustrated in FIG. 3, a pop-up window 35 is displayed above the person P appearing in the picture area 31D. The pop-up window 35 is used for determining whether the person P should be monitored, and whether the person P is the same person as, or not the same as, the person who has been registered as a person to be monitored in the person-to-be-monitored display area 33.

The pop-up window 35 is displayed near a newly detected person P, and the position of the pop-up window 35 also moves pursuant to the movement (motion) of the person P.

As a result of displaying the pop-up window 35 near the target person P as described above, it is possible to yield effects such as facilitating the identification of the person P to be newly registered by the user, facilitating the comparison of the person P and a registered person to be monitored, and narrowing the operation range.

Note that the pop-up window 35 does not necessarily need to move in accordance with the movement of the person P. For example, the pop-up window 35 may also be displayed by being fixed at a given location for at least a given period of time. It will thereby be easier to make inputs in comparison to case where the pop-up window 35 will move.

Moreover, when the pop-up window 35 is displayed, since the picture area which overlaps with the pop-up window 35 cannot be viewed and the visibility may deteriorate, it is also possible to provide a function of causing the pop-up window 35 to be hidden when the outside of the pop-up window 35 is clicked (selected), or a function of contrarily displaying the pop-up window 35 when the area (person area) including the periphery of the person P in the picture area 31 is clicked.

(1.2.4 Specific Example of Pop-Up Window)

Figure 4:
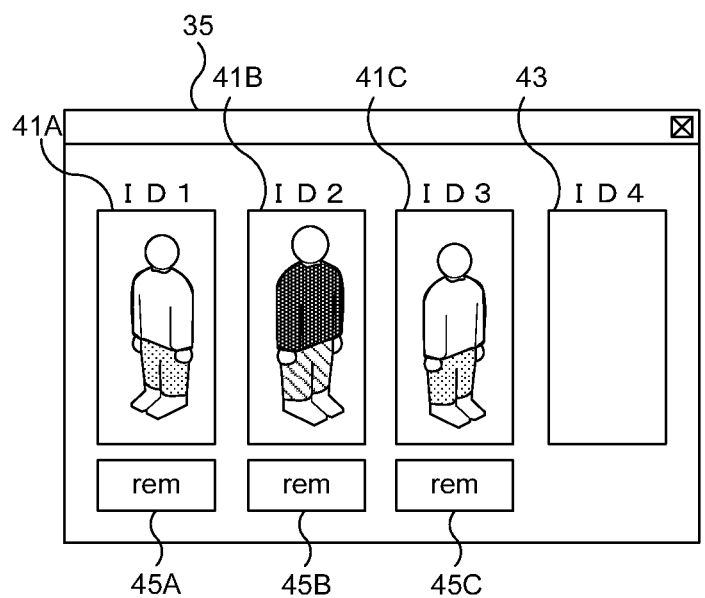
FIG. 4 is a diagram showing a specific example of the pop-up window displayed on the display screen.

FIG. 4 is a diagram showing a specific example of the pop-up window 35. In the example of FIG. 4, human images 41A to 41C (hereinafter collectively referred to as the "human images 41") as thumbnails of the persons to be monitored respectively assigned with ID1, ID2, and ID3, and a blank image 43 assigned with ID4 are arranged side by side.

When the user selects a human image 41, the person-to-be-tracked registration unit 130 associates the person to be monitored corresponding to that human image 41 and the person P appearing in the picture (moving image) as being the same person. Moreover, when the user selects the blank image 43, the person-to-be-tracked registration unit 130 registers the person P appearing in the picture as a new person to be monitored having an ID4.

In addition, registration buttons 45A to 45C (indicated as "rem" in the diagram to represent "remove"; hereinafter also collectively referred to as the "registration buttons 45") for the user to register that it is not the same person provided below the human images 41 are used by the user for registering that the previously registered persons to be monitored corresponding to ID1, ID2 and ID3 are not the same person as the person P appearing in the picture.

Moreover, here, the respective persons disposed in the pop-up window 35 may be arranged in ascending order or descending order from the person who is most likely to coincide or not likely to coincide with the person P. The possibility of coinciding with the person P may be estimated (calculated) by the correspondence relationship estimation unit 140. Otherwise, a person who is not likely to coincide with the person P may be prevented from being displayed in the pop-up window 35 in advance. As a result of adopting this kind of method, the user can easily select the person who corresponds (or does not correspond) to the person P.

(1.2.5 Estimation Method of Correspondence Relationship)

The method of estimating the correspondence relationship of the persons captured by the video cameras 200 is now explained with reference to FIG. 5 to FIG. 7. FIG. 5 to FIG. 7 are diagrams explaining the estimation method of the correspondence relationship of the persons captured by the video cameras 200.

Figure 5:
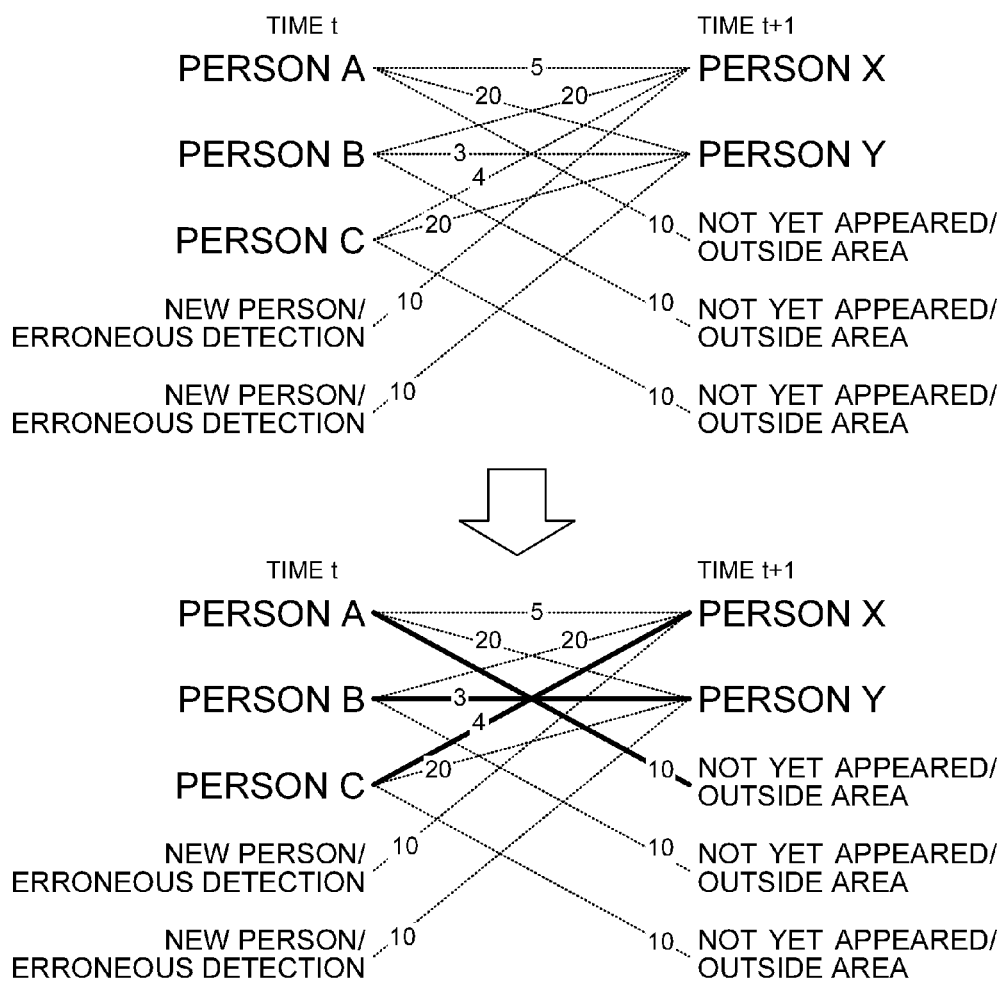
FIG. 5 is a diagram explaining the method of estimating the correspondence relationship of persons.

In FIG. 5, the left side of the diagram represents persons of time t, and the right side of the diagram represents persons of time t+1. When the association is completed, the person A to the person C detected at time t are associated, 1:1, with one of the items on the right side indicating the state at time t+1, and the person X and the person Y detected at time t+1 are associated, 1:1, with one of the items on the left side indicating the state at time t.

Here, the reason why the item of "New person/Erroneous detection" is indicated twice on the left side is because there is a possibility that neither the person X nor the person Y corresponds to any one among the person A to the person C, and the reason why the item of "Not yet appeared/Outside area" is indicated three times on the right side is because there is a possibility that the none among the person A to the person C corresponds to the person X and the person Y.

The numerical values indicated on the lines respectively indicate the cost of the respective items being associated. The higher the numerical value, the higher the possibility of association, and the lower the numerical value, the lower the possibility of association. To explain is upon taking the person A in the example of FIG. 5 as an example, the person A has the highest probability of being associated with the person X (cost 5), has the next highest probability of corresponding to "Not yet appeared" (cost 10), and has the lowest probability of being associated with the person Y (cost 20).

This kind of cost is calculated by the correspondence relationship estimation unit 140 according to the similarity of the characteristic feature values of each of the detected persons (person X and person Y) and the person A, or based on the comparison of the elapsed time from time t to time t+1, and the average time of reaching the shooting position where the person X was detected or the shooting position where the person Y was detected from the position where the person A was detected. For example, if the similarity of the characteristic feature values of the person A and the person X is high, the possibility that the person A and the person X will become associated will increase (cost will decrease). Moreover, if the coincidence of the average time of reaching the position where the person X was detected from the position where the person A was detected and the elapsed time is high, the possibility that the person A and the person X will become associated will increase (cost will decrease). Note that the time required for moving between the shooting ranges of the cameras can be acquired or calculated from the camera arrangement information 161.

Since the act of obtaining the combination of associations can be understood to be an assignment problem, for example, the optimal correspondence relationship can be obtained based on the Hungarian method or the like. In other words, a combination that will cause the sum of the foregoing costs to be low may be obtained. According to the example of FIG. 5, the person A has/is "Not yet appeared/Outside area", the person B corresponds to the person Y, and the person C corresponds to the person X results in the total of 17 costs, and is the smallest among all combinations. Thus, the correspondence relationship estimation unit 140 can estimate this correspondence relationship as being the correspondence relationship with the highest possibility.

The estimation method to be performed by the correspondence relationship estimation unit 140 when the user performs the association operation of persons is now explained with reference to FIG. 6. The example of FIG. 6 is a diagram explaining the method of estimating the correspondence relationship when the user associates the person A and the person X.

In the foregoing case, since the person A will be associated with the person X without fail, the cost that the person A and the person X are the same person is 0. Based on this premise, when the correspondence relationship is obtained based on the Hungarian method, the combination that will cause the sum of the cost to be low is the combination of the person A corresponding to the person X, the person B corresponding to the person Y, and the person C corresponding to "Not yet appeared/Outside area".

In other words, by the user merely performing the association of the person A, the correspondence relationship of other persons (person C in the example of FIG. 6) is also affected (results are different from the case of FIG. 5).

Figure 6:
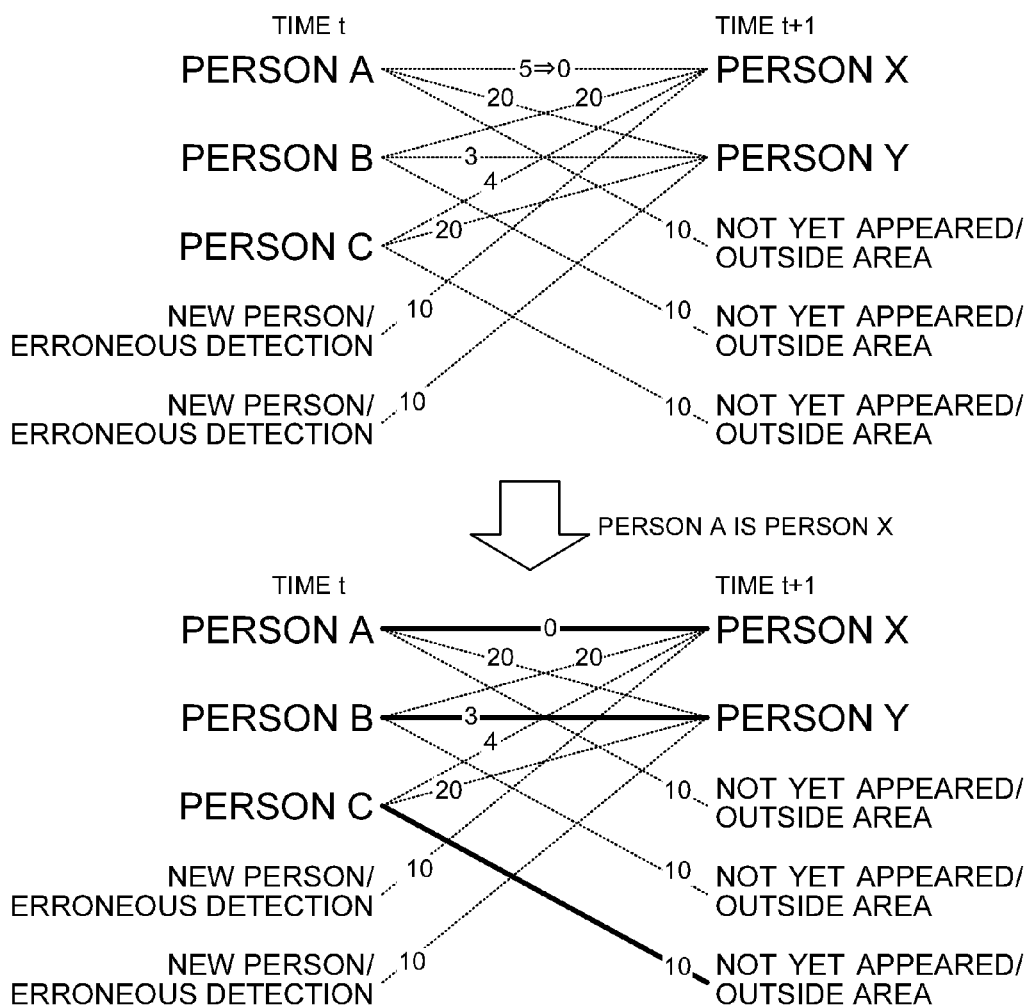
FIG. 6 is a diagram explaining the method of estimating the correspondence relationship of persons.
Figure 7:
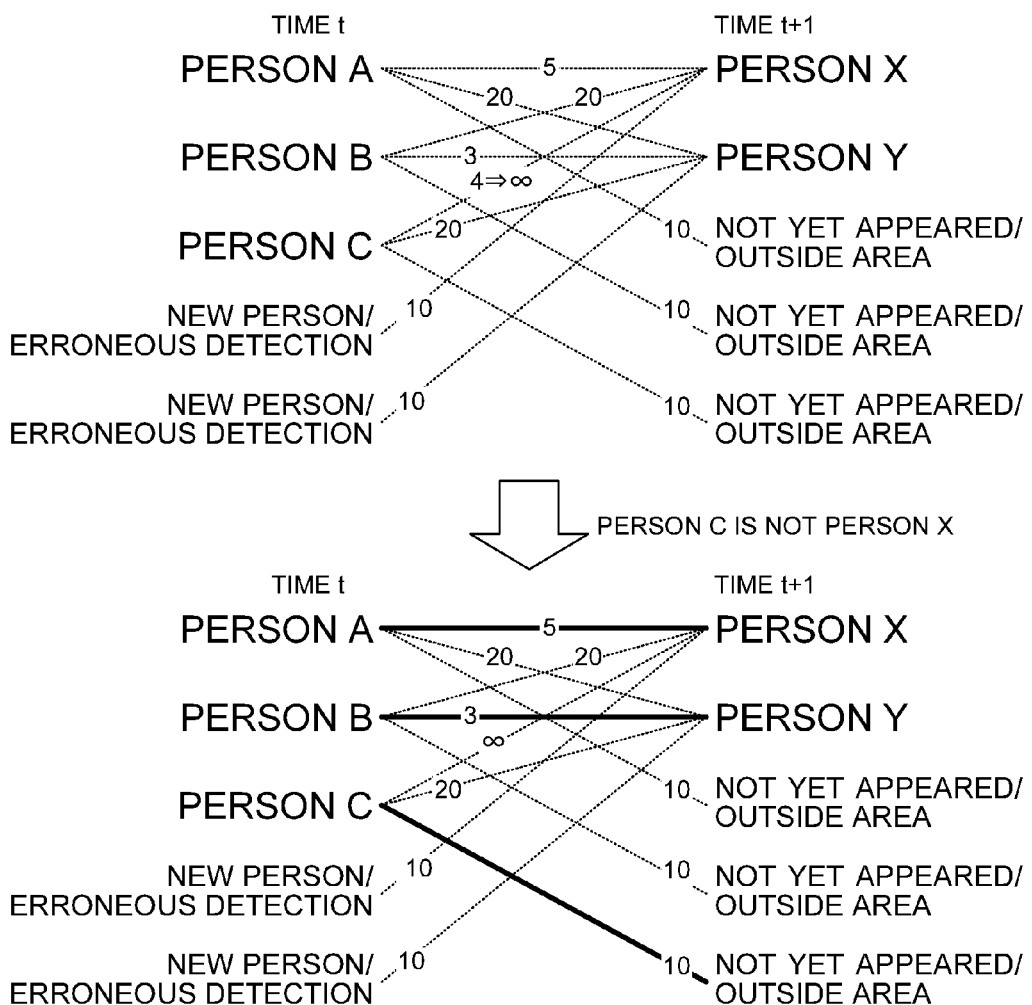
FIG. 7 is a diagram explaining the method of estimating the correspondence relationship of persons.

FIG. 6 showed a case where the user made an input to the effect that "the persons are the same person", while a case where the user makes an input to the effect that "the persons are not the same person" may also arise. FIG. 7 shows an example when the user make an input to the effect that "the person C and the person X are not the same person".

In the foregoing case, since the person C will never be associated with the person X, the cost that the person C and the person X are the same person is infinite (note that the cost does not need to be infinite, and it will suffice so as long as a sufficiently large cost is set). Based on this premise, when the correspondence relationship is obtained based on the Hungarian method, the combination that will cause the sum of the cost to be low is the combination of the person A corresponding to the person X, the person B corresponding to the person Y, and the person C corresponding to "Not yet appeared/Outside area".

In other words, as with the example of FIG. 6, by the user merely performing the association to the effect that the person C is not the same person, the correspondence relationship of other persons (person A in the example of FIG. 7) is also affected (results are different from the case of FIG. 5).

As described above, as a result of enabling the user to make the input to the effect of "the persons are the same person" and "the persons are not the same person", and additionally predicting the correspondence relationship of the persons based on the foregoing input, prediction results of suitable correspondence relationship can be obtained for all persons to be monitored.

Note that, while the correspondence relationship was estimated based on the cost in the foregoing example, the configuration is not limited thereto. For example, since the cost accounts for the same amount of information as the plausibility (likelihood) to be associated, the association may also be predicted based on likelihood. Note that the cost and likelihood are of the following relation; namely, cost=−log likelihood.

Moreover, while the combination of associations is collectively predicted in the foregoing example, the configuration is not limited thereto. For example, it is also possible to calculate, for each of the person A to the person C, the probability that the person X will correspond, the probability that the person Y will correspond, and the probability of corresponding to "Not yet appeared/Outside area". Several methods may be considered for the foregoing calculation, and, for instance, the calculation may be performed based on one of the following formulae.

(Probability that person A and person X will correspond)=(sum of probability of correspondence relationship including a correspondence relationship of person A and person X)/(sum of probability of all correspondence relationships)   [Formula 1]

(Probability that person A and person X will correspond)=(likelihood that person A and person X will correspond)/(sum of likelihood of person A and all targets)   [Formula 2]

(Probability that person A and person X will correspond)=(likelihood that person A and person X will correspond)/(sum of likelihood of all persons and person X) [Formula 3]

Here, the probability of a certain correspondence relationship is calculated as the product of all likelihoods that were assigned in an assignment problem. For example, the probability relative to the correspondence relationship shown at the lower part of FIG. 5 can be calculated as the product of the likelihood that the person A has/is "Not yet appeared/Outside area" and the likelihood that the person B is the person Y and the likelihood that the person C is the person X. Moreover, the probability relative to the correspondence relationship shown at the lower part of FIG. 6 can be calculated as the product of the likelihood that the person A is the person X and the likelihood that the person B is the person Y and the likelihood that the person C has/is "Not yet appeared/Outside area".

As a result of using the foregoing formulae, it is possible to calculate the probability that the person X corresponds to the person A, the probability that the person X corresponds to the person B, the probability that the person X is subject to human monitoring, and the probability that the person X is a new person/erroneous detection. Based on the foregoing probabilities, the top N-number of persons may be presented to the user by being indicated on the pop-up window 35 as the persons who are likely to correspond to the person X. The same applies to the person Y.

(1.2.6 Display of Person Moving Path)

The movement history generation unit 155 can display the movement history of the person to be monitored based on the correspondence relationship of the persons estimated by the correspondence relationship estimation unit 140 according to the user operation. FIG. 8 is a diagram showing a specific example of the movement history display screen 80 generated by the movement history generation unit 155. Note that the movement history display screen 80 of FIG. 8 is generated by the movement history generation unit 155, for instance, when the designation of the person to be monitored is received from the user on the person-to-be-monitored display area 33 in the monitoring screen 30 illustrated in FIG. 3, and a command for displaying the movement history of that person to be monitored is made by the user. Here, the command from the user is input to the information processing server 100 as an operation signal from the input device 400.

The movement history display screen 80 shown in FIG. 8 includes a movement history display area 81, and a person-to-be-monitored selection area 83. When the person to be monitored is selected on the person-to-be-monitored selection area 83, the moving path of that person to be monitored is displayed on the map of the movement history display area 81.

In the example of FIG. 8, the movement history of the person to be monitored is indicated by connecting a solid line and a broken line. Among these lines, the solid line portion indicates the results of the video cameras 200 performing tracking within the camera, and the broken line portion indicates the moving path that is decided based on the correspondence relationship estimated by the correspondence relationship estimation unit 140.

(1.3 Flow of Processing)

Figure 9:
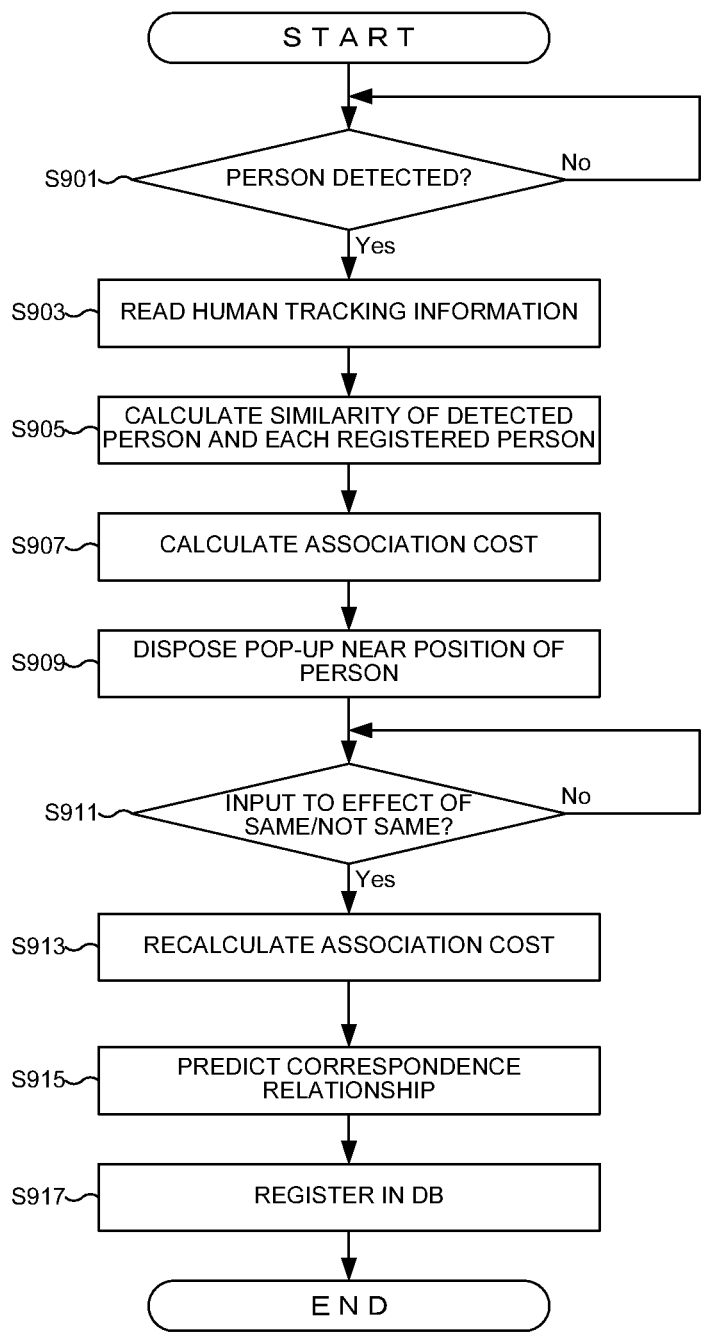
FIG. 9 is a flowchart showing the flow of processing of the information processing server illustrated in FIG. 1.

The flow of processing of the information processing server 100 is now explained with reference to FIG. 9. FIG. 9 is a flowchart showing the flow of processing of the information processing server 100 according to this embodiment.

Note that each of the processing steps described later can be executed by arbitrarily changing the order or in parallel to the extent that no inconsistency will arise in the processing contents. Moreover, another step may be added between the respective processing steps. In addition, a step that is indicated as one step for the sake of convenience may be executed by being separated into a plurality of steps, and a step that is indicated by being separated into a plurality of steps for the sake of convenience may be executed as a single step.

Foremost, the input unit 110 determines, based on the information received from the video cameras 200, whether a person as an object to be detected exists in the pictures captured by the video cameras 200 (S901). If a person is detected based on the foregoing determination (S901; Yes), the similarity calculation unit 120 reads the human tracking information 167 (S903), and calculates the similarity by comparing the characteristic feature value of the person who was previously detected by another video camera 200, and the characteristic feature value of the person who was detected this time (S905).

In addition, the correspondence relationship estimation unit 140 calculates the cost of association (described above with reference to FIG. 5 to FIG. 7) in accordance with the similarity calculated in S905, and the relation of the elapsed time and distance between cameras (S907). In addition, the correspondence relationship estimation unit 140 calculates probability that the persons will become associated based on the cost (likelihood and amount of information are the same).

The UI generation unit 153 displays a pop-up window 35 in which are arranged in ascending order, in accordance with the probability calculated in S907, the persons to be monitored likely to correspond with the person appearing in the picture being displayed in the picture area 31 (S909).

When the user uses the pop-up window 35 and makes an input to the effect that the persons are the same or not the same (S911; Yes), the correspondence relationship estimation unit 140 recalculates the cost of association of the persons according to the foregoing input (S913), and estimates the correspondence relationship of all persons based on that cost (S915). In addition, the correspondence relationship estimation unit 140 registers the estimated correspondence relationship of the persons as the human tracking information 167 in the DB 160.

(1.4 Hardware Configuration)

An example of the hardware configuration for realizing the foregoing information processing server 100 with a computer is now explained with reference to FIG. 10. Note that, as described above, the functions of the information processing server 100 can be realized using a plurality of information processing apparatuses.

Figure 10:
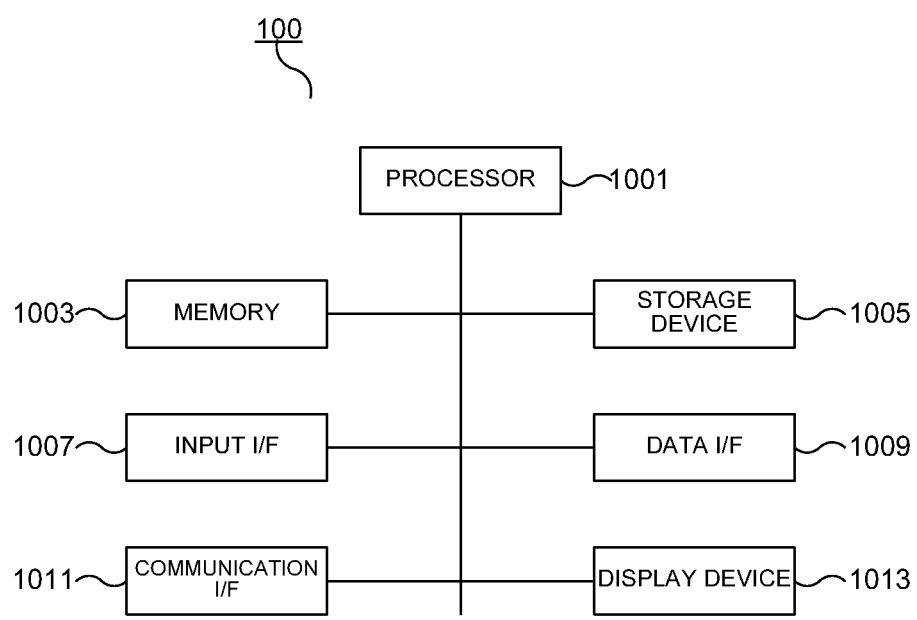
FIG. 10 is a block diagram showing the hardware configuration capable of implementing the information processing server illustrated in FIG. 1.

As shown in FIG. 10, the information processing server 100 includes a processor 1001, a memory 1003, a storage device 1005, an input interface (I/F) 1007, a data I/F 1009, a communication I/F 1011, and a display device 1013.

The processor 1001 controls the various types of processing in the information processing server 100 by executing the programs stored in the memory 1003. For example, the processing pertaining to the input unit 110, the similarity calculation unit 120, the person-to-be-tracked registration unit 130, the correspondence relationship estimation unit 140, and the display control unit 150 explained in FIG. 1 can be realized as programs that mainly run on the processor 1001 upon temporarily being stored in the memory 1003.

The memory 1003 is a storage medium such as a random access memory (RAM). The memory 1003 temporarily stores program codes of the programs to be executed by the processor 1001, and data that is required upon executing the programs. For example, a stack area that is required upon executing the programs is reserved in the storage area of the memory 1003.

The storage device 1005 includes, for instance, a hard disk or a non-volatile storage medium such as a flash memory. The storage device 1005 stores, for instance, an operating system, various programs for realizing the input unit 110, the similarity calculation unit 120, the person-to-be-tracked registration unit 130, the correspondence relationship estimation unit 140, and the display control unit 150, and various types of data including the camera arrangement information 161, the captured moving image 163, the detected person information 165, and the human tracking information 167 stored as the DB 160. The programs and data stored in the storage device 1005 are referred to by the processor 1001 by being loaded into the memory 1003 as needed.

The input I/F 1007 is a device for receiving inputs from the user. The input device 400 explained with reference to FIG. 1 can also be realized by the input I/F 1007. As a specific example of the input I/F 1007, a keyboard or a mouse, a touch panel, and various sensors may be used. The input I/F 1007 may also be connected to the information processing server 100 via an interface such as a universal serial bus (USB).

The data I/F 1009 is a device for inputting data from the outside of the information processing server 100. As a specific example of the data I/F 1009, there is a drive device for reading data stored in various storage mediums. The data I/F 1009 may also be provided outside the information processing server 100. In the foregoing case, the data I/F 1009 is connected to the information processing server 100 via an interface such as a USB.

The communication I/F 1011 is a device for performing data communication, via wire or wireless, with an external device of the information processing server 100 such as the video camera 200. The communication I/F 1011 may also be provided outside the information processing server 100. In the foregoing case, the communication I/F 1011 is connected to the information processing server 100 via an interface such as a USB.

The display device 1013 is a device for displaying various types of information. The display device 300 explained with reference to FIG. 1 can also be realized with the display device 1013. As a specific example of the display device 1013, for instance, a liquid crystal display or an organic electro-luminescence (EL) display may be used. The display device 1013 may also be connected to the outside of the information processing server 100. In the foregoing case, the display device 1013 is connected to the information processing server 100 via a display cable or the like.

(1.5 Effect of this Embodiment)

As explained above, with the monitoring system 1 according to this embodiment, it is possible to receive an input from the user to the effect that two persons are the same person and two persons are not the same person, and a suitable correspondence relationship of persons can be estimated according to the foregoing input. In particular, even when an input is made regarding only one person, it is possible to affect the estimation of correspondence relationship of other persons.

Even in cases where it is difficult for the user to determine that two persons are the same person, there are many cases that the user can determine that such two persons are not the same person with high accuracy. Thus, by enabling the repetition of such highly accurate user inputs, and predicting the correspondence relationship of persons according to such inputs, it is possible to increase the prediction accuracy.

2 Second Embodiment

Figure 11:
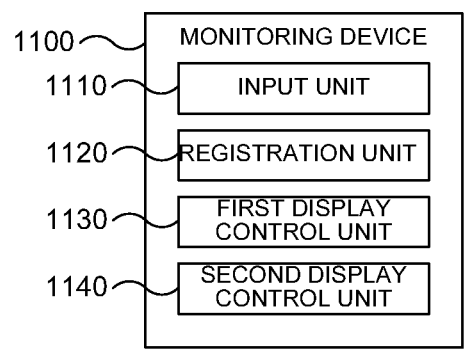
FIG. 11 is a functional block diagram showing a schematic configuration of the monitoring device according to the second embodiment.

The second embodiment is now explained with reference to FIG. 11. FIG. 11 is a block diagram showing the functional configuration of a monitoring device 1100 as an image processing system. As shown in FIG. 11, the monitoring device 1100 includes an input unit 1110, a registration unit 1120, a first display control unit 1130, and a second display control unit 1140.

The input unit 1110 receives the input of pictures captured by a plurality of video cameras. The registration unit 1120 can register one or more persons appearing in the pictures input from the input unit 1110. This registration is performed, for example, based on the users command.

The first display control unit 1130 displays, on a display device not shown, the pictures input from the input unit 1110. Moreover, the second display control unit 1140 can register that the person appearing in the picture displayed by the first display control unit 1130 and the person registered by the registration unit 1120 are the same person, or not the same person. This registration is performed, for example, based on the users command.

As a result of adopting the foregoing configuration, according to the monitoring device 1100 according to this embodiment, it is possible to suitably perform the association of a person in a picture.

3 Supplementary Information

Note that the configuration of the foregoing embodiments may be combined or a partial configuration may be substituted. Moreover, the configuration of the present invention is not limited to the foregoing embodiments, and may be variously modified to the extent that the modification does not deviate from the gist of the present invention.

Note that a part or all of the respective embodiments described above may be as described in the following Notes, but are not limited thereto. Moreover, the program of the present invention will suffice so as long as it is a program capable of causing a computer to execute the respective operations explained in each of the foregoing embodiments.

(Supplementary Note 1)

An image processing system comprising: input means for receiving an input of pictures captured by a plurality of video cameras; registration means capable of registering one or more persons appearing in the pictures input from the input means; first display control means for displaying, on a display device, the pictures input by the input means; and second display control means capable of registering that the person appearing in the displayed pictures and the person registered by the registration means are the same person, or not the same person.

(Supplementary Note 2)

The image processing system of supplementary note 1, further comprising estimation means for estimating a correspondence relationship of one or more persons appearing in the pictures captured by the plurality of video cameras based on results of the registration that the person appearing in the displayed pictures and the person registered by the registration means are the same person, or not the same person.

(Supplementary Note 3)

The image processing system of supplementary note 2, further comprising third display control means for displaying, on a display device, a movement history of the person based on the correspondence relationship of the person obtained as a result of the estimation by the estimation means.

(Supplementary Note 4)

The image processing system of supplementary note 2 or 3, wherein the estimation means estimates the correspondence relationship of the person based on at least one of a distance between the video cameras, time spent by the person for movement, and relation of a characteristic feature value of the person, and results of the registration that the person appearing in the displayed pictures and the person registered by the registration means are the same person, or not the same person.

(Supplementary Note 5)

An image processing method to be performed by an image processing system, the method comprising the steps of: receiving an input of pictures captured by a plurality of video cameras; enabling registration of one or more persons appearing in the input pictures; displaying the inputs pictures on a display device; and enabling registration to the effect that the person appearing in the displayed pictures and the registered person are the same person, or not the same person.

(Supplementary Note 6)

The image processing method of supplementary note 5, wherein the image processing system additionally performs the step of estimating a correspondence relationship of one or more persons appearing in the pictures captured by the plurality of video cameras based on results of the registration that the person appearing in the displayed pictures and the person registered by the registration means are the same person, or not the same person.

(Supplementary Note 7)

The image processing method of supplementary note 6, wherein the image processing system additionally performs the step of displaying, on a display device, a movement history of the person based on the correspondence relationship of the person obtained as a result of the estimation.

(Supplementary Note 8)

The image processing method of supplementary note 6 or 7, wherein the estimation of the correspondence relationship of the person is performed based on at least one of a distance between the video cameras, time spent by the person for movement, and relation of a characteristic feature value of the person, and results of the registration that the person appearing in the displayed pictures and the person registered by the registration means are the same person, or not the same person.

(Supplementary Note 9)

A program for causing a computer to execute: processing of receiving an input of pictures captured by a plurality of video cameras; processing of enabling registration of one or more persons appearing in the pictures input from the input means; processing of displaying the inputs pictures on a display device; and processing of enabling registration to the effect that the person appearing in the displayed pictures and the registered person are the same person, or not the same person.

(Supplementary Note 10)

The program of supplementary note 9, wherein the program additionally causes a computer to perform processing of estimating a correspondence relationship of one or more persons appearing in the pictures captured by the plurality of video cameras based on results of the registration that the person appearing in the displayed pictures and the person registered by the registration means are the same person, or not the same person.

(Supplementary Note 11)

The program of supplementary note 10, wherein the program additionally causes a computer to perform processing of displaying, on a display device, a movement history of the person based on the correspondence relationship of the person obtained as a result of the estimation.

(Supplementary Note 12)

The program of supplementary note 10 or 11, wherein the estimation of the correspondence relationship of the person is performed based on at least one of a distance between the video cameras, time spent by the person for movement, and relation of a characteristic feature value of the person, and results of the registration that the person appearing in the displayed pictures and the person registered by the registration means are the same person, or not the same person.

This application relates to and claims priority from Japanese Patent Application No. 2012-205912, filed on Sep. 19, 2012, the entire disclosure of which is incorporated herein by reference.

I claim:

1. An image processing system, comprising:
a memory storing instructions; and
a processor configured to execute the instructions to:
receive pictures captured by a plurality of video cameras;
register a first person appearing in the pictures;
calculate similarities between one or more persons who were previously registered and the first person by comparing characteristic feature values of the previously registered persons and a characteristic feature value of the first person;
display, on a display device, the pictures;
provide a user interface to receive a user input indicative of whether a second person appearing in the displayed pictures and the first person are the same person or different persons, the second person being one of the previously registered persons;
recalculating the similarities between the previously registered persons and the first person based on the user input; and
tracking the first person across the pictures captured by the plurality of video cameras based on the recalculated similarities,
wherein the pictures showing the first and second persons are captured at different points in time,
wherein the user interface is a pop-up window which displays the one or more previously registered persons in ascending order in accordance with the calculated similarities of the one or more previously registered persons to the first person, and
wherein the pop-up window is displayed on the pictures and adjacent to the first person.

2. The image processing system of claim 1, wherein the processor is further configured to execute the instructions to:
estimate a correspondence relationship between the first and second persons based on the user input indicative of whether the first person and the second person are the same person or different persons.

3. The image processing system of claim 2, wherein the processor is further configured to execute the instructions to:
display, on the display device, a movement history of the second person based on the correspondence relationship of the first and second persons.

4. The image processing system of claim 2, wherein the processor is further configured to execute the instructions to:
estimate the correspondence relationship based on at least one of distances between the video cameras, time spent by the second person for movement, and a relation between characteristic feature values of the first and second persons.

5. An image processing method to be performed by an image processing system, the method comprising:
receiving pictures captured by a plurality of video cameras;
registering a first person appearing in the pictures;
calculating similarities between one or more persons who were previously registered and the first person by comparing characteristic feature values of the previously registered persons and a characteristic feature value of the first person;
displaying the pictures on a display device;
providing a user interface to receive a user input indicative of whether a second person appearing in the displayed pictures and the first person are the same person or different persons, the second person being one of the previously registered persons;
recalculating the similarities between the previously registered persons and the first person based on the user input; and
tracking the first person across the pictures captured by the plurality of video cameras based on the recalculated similarities,
wherein the pictures showing the first and second persons are captured at different points in time,
wherein the user interface is a pop-up window which displays the one or more previously registered persons in ascending order in accordance with the calculated similarities of the one or more previously registered persons to the first person, and
wherein the pop-up window is displayed on the pictures and adjacent to the first person.

6. A non-transitory computer-readable storage medium storing instructions that, when executed by a processor, cause the processor to perform a method comprising:
receiving pictures captured by a plurality of video cameras;
registering a first person appearing in the pictures;
calculating similarities between one or more persons who were previously registered and the first person by comparing characteristic feature values of the previously registered persons and a characteristic feature value of the first person;
displaying the pictures on a display device; and
providing a user interface to receive a user input indicative of whether a second person appearing in the displayed pictures and the first person are the same person or different persons, the second person being one of the previously registered persons;
recalculating the similarities between the previously registered persons and the first person based on the user input; and
tracking the first person across the pictures captured by the plurality of video cameras based on the recalculated similarities,
wherein the pictures showing the first and second persons are captured at different points in time,
wherein the user interface is a pop-up window which displays the one or more previously registered persons in ascending order in accordance with the calculated similarities of the one or more previously registered persons to the first person, and
wherein the pop-up window is displayed on the pictures and adjacent to the first person.

7. An image processing system, comprising:
input means configured to receive pictures captured by a plurality of video cameras;
registration means configured to register a first person appearing in the pictures;
calculation means configured to calculate similarities between one or more persons who were previously registered and the first person by comparing characteristic feature values of the previously registered persons and a characteristic feature value of the first person;
first display control means configured to display, on a display device, the pictures; and
second display control means configured to provide a user interface to receive a user input indicative of whether a second person appearing in the displayed pictures and the first person are the same person or different persons, the second person being one of the previously registered persons;
recalculation means configured to recalculate the similarities between the previously registered persons and the first person based on the user input; and
tracking means configured to track the first person across the pictures captured by the plurality of video cameras based on the recalculated similarities,
wherein the pictures showing the first and second persons are captured at different points in time,
wherein the user interface is a pop-up window which displays the one or more previously registered persons in ascending order in accordance with the calculated similarities of the one or more previously registered persons to the first person,
wherein the pop-up window is displayed on the pictures and adjacent to the first person.

8. The method of claim 5, further comprising:
estimating a correspondence relationship between the first and second persons based on the user input indicative of whether the first person and the second person are the same person or different persons.

9. The method of claim 8, further comprising:
displaying, on the display device, a movement history of the second person based on the correspondence relationship of the first and second persons.

10. The method of claim 8, further comprising:
estimating the correspondence relationship based on at least one of distances between the video cameras, time spent by the second person for movement, and a relation between characteristic feature values of the first and second persons.

11. The medium of claim 6, wherein the method further comprises:
estimating a correspondence relationship between the first and second persons based on the user input indicative of whether the first person and the second person are the same person or different persons.

12. The medium of claim 11, wherein the method further comprises:
displaying, on the display device, a movement history of the second person based on the correspondence relationship of the first and second persons.

13. The medium of claim 11, wherein the method further comprises:
estimating the correspondence relationship based on at least one of distances between the video cameras, time spent by the second person for movement, and a relation between characteristic feature values of the first and second persons.

14. The image processing system of claim 7, further comprising:
estimation means configured to estimate a correspondence relationship between the first and second persons based on the user input indicative of whether the first person and the second person are the same person or different persons.

15. The image processing system of claim 14, further comprising:
third display control means configured to display, on the display device, a movement history of the second person based on the correspondence relationship of the first and second persons.

16. The image processing system of claim 14, wherein the estimation means is further configured to:
estimate the correspondence relationship based on at least one of distances between the video cameras, time spent by the second person for movement, and a relation between characteristic feature values of the first and second persons.

\* \* \* \* \*